May 24, 1960 N. REESE 2,937,441
SHEARS
Filed Oct. 16, 1958
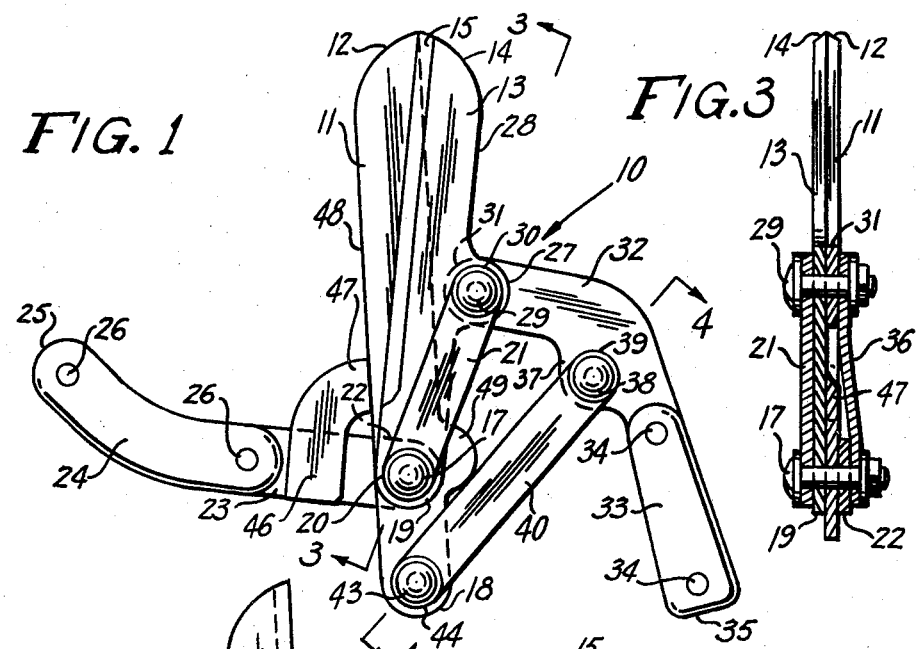
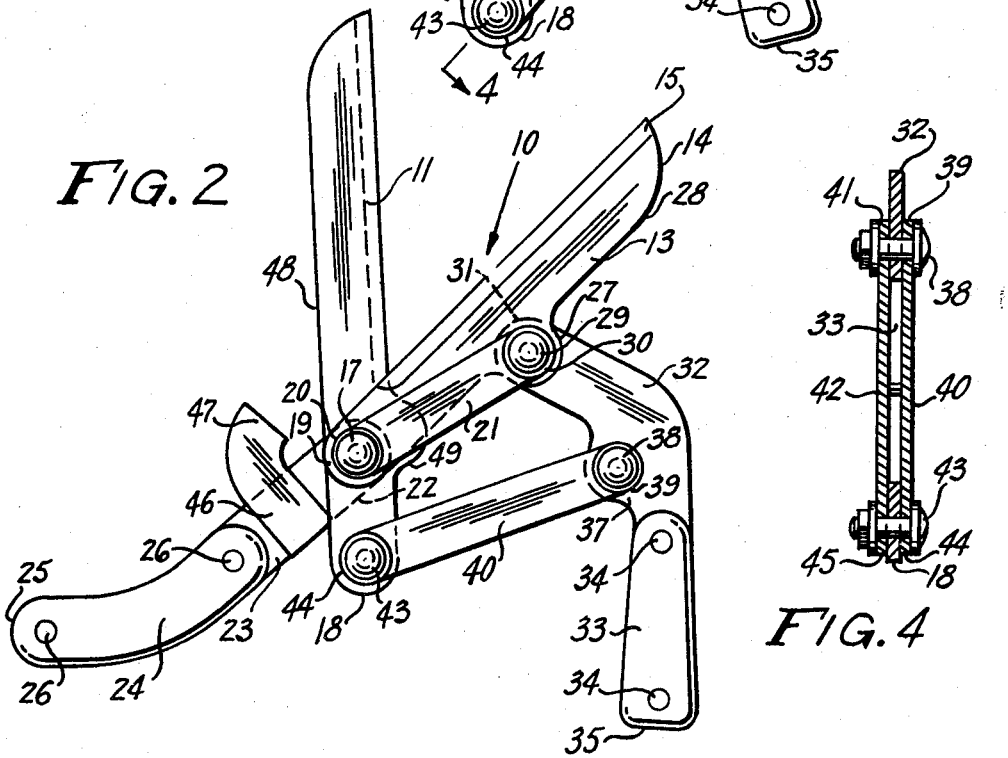
INVENTOR.
NOBLE REESE
BY
Patrick D. Beavers
ATTY.

United States Patent Office 2,937,441
Patented May 24, 1960

2,937,441

SHEARS

Noble Reese, Rte. 1, Box 40, Ore City, Tex.

Filed Oct. 16, 1958, Ser. No. 767,598

1 Claim. (Cl. 30—245)

This invention relates to improvements in shears and more particularly to shears that are intended to be used for trimming shrubbery.

An object of this invention is to provide shears that employ a blade that is held stationary and another blade that is moved in relation to the first blade so that a more forceful cutting action is achieved.

Another object of the invention is to provide shears having a pair of handles that are so arranged that during the operation of the shears there is no danger of mashing the hands or fingers of the operator.

A further object of the invention is to provide shears that are simple in construction, durable and efficient to operate and inexpensive to manufacture.

With the above and other objects and advantages in view, the invention consists of the novel details of construction, arrangement and combination of parts more fully hereinafter described, claimed and illustrated in the accompanying drawing, in which:

Fig. 1 is an elevational view of shears embodying the invention in closed position;

Fig. 2 is a view similar to Fig. 1, wherein the shears are shown in open position;

Fig. 3 is a vertical sectional view on the line 3—3 of Fig. 1; and

Fig. 4 is a vertical sectional view on the line 4—4 of Fig. 1.

Referring more in detail to the drawing, wherein like parts are designated by like reference numerals, the reference numeral 10 is used to generally designate shears that embody the invention.

The shears 10 comprise a straight main cutting blade 11 having an arcuate outer edge 12 at one end thereof and a straight secondary cutting blade 13 that is also provided with an arcuate outer edge 14 at one end thereof and each of the blades 11 and 13 have a cutting edge 15.

A pivot bolt 17 is mounted in the blade 11 adjacent the opposite end 18 and the opposite end 19 of the blade 13 is mounted on the bolt 17 as is one end 20 of a link 21 and an end 22 of a short handle 23. The handle 23 has an arcuate hand grip 24 on an outer end 25 thereof which is secured to the handle 23 by fasteners 26.

A rounded projection 27 is formed on the rear edge 28 of the blade 13 and a pivot bolt 29 is mounted in the projection 27. An end 30 of the link 21 and an end 31 of the main handle 32 are pivotally mounted on the bolt 29 and the handle 32 is substantially L-shaped and has a hand grip 33 secured by fasteners 34 to an end 35 thereof.

A second link 36, somewhat similar to the link 21, is mounted on the pivot bolts 17 and 29 in opposed parallel relation to the link 21.

A curved projection 37 is provided at the approximate center of the handle 32 and a pivot bolt 38 is mounted in the projection 37.

An end 39 of a link 40 is mounted on the bolt 38 as is an end 41 of a link 42. A pivot bolt 43 is mounted in the end 18 of the blade 11 and an end 44 of the link 40 is mounted on the bolt 43 as is an end 45 of the link 42. The links 40 and 42 are also in opposed parallel relation to each other.

A stop member 46 having a curved end 47 is secured to the handle 23 between the hand grip 24 and pivot bolt 17 and the curved end 47 is adapted to abut the rear edge 48 of the blade 11 to limit the movement thereof.

The blade 11 is also provided with a rounded stop 49 in alinement with the bolt 17 and the stop 49 is adapted to engage the edge of the link 42 to limit the movement of the blades 11 and 13 in overlapping relation to each other.

In the operation of the shears 10 the hand grip 24 is grasped by the left hand and the hand grip 33 is grasped by the right hand.

The left hand is held stationary and the right hand moves the handle 32 forwardly to move the blade 13 into cutting engagement with the blade 11. The curved end 47 of the stop 46 engaging the edge 48 of the blade 11 keeps the blade 11 from moving when the blade 13 is moved toward the blade 11, thus any material between the blades 11 and 13 will be severed. Great force is applied by the movement of the blade 11 so that the severance of the material is quick and efficient. The stop 49 prevents the cutting edge 15 of the blades 11 and 13 from overlapping too far.

There has thus been provided an efficient and durable shears and it is believed that the operation and construction of the shears will be apparent to those skilled in the art.

It is also to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

Shears comprising a main blade, a secondary blade, a pivot bolt pivotally connecting said secondary blade to said main blade, a first handle pivotally connected to said secondary blade, a second handle pivotally mounted on said pivot bolt, a stop member mounted on said second handle to engage said main blade to limit the movement of said main blade in relation to said secondary blade, a pair of parallel links connected to said pivot bolt and to the pivotal connection between said second blade and said first handle, a second pivot bolt mounted in the end of said main blade, a third pivot bolt mounted in the center of said second handle and a pair of parallel links are connected at their opposite ends to said second and third pivot bolts, a stop member provided on said main blade that is adapted to engage one of the links connected to said second and third pivot bolts to limit the overlapping relationship of said main blade and said second blade.

References Cited in the file of this patent

UNITED STATES PATENTS

| | | |
|---|---|---|
| 117,495 | Whittaker | July 25, 1871 |
| 148,659 | Booker et al. | Mar. 17, 1874 |
| 936,574 | Searight | Oct. 12, 1909 |
| 938,627 | Arneson | Nov. 2, 1909 |
| 1,469,072 | Dodson | Sept. 25, 1923 |